(12) United States Patent  (10) Patent No.: US 8,479,696 B2
Sai                        (45) Date of Patent:     Jul. 9, 2013

(54) VALVE TRAIN OF INTERNAL COMBUSTION ENGINE

(75) Inventor: Koshoku Sai, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 337 days.

(21) Appl. No.: 12/973,199

(22) Filed: Dec. 20, 2010

(65) Prior Publication Data

US 2011/0146604 A1   Jun. 23, 2011

(30) Foreign Application Priority Data

Dec. 22, 2009  (JP) .................................. 2009-290506

(51) Int. Cl.
    *F01L 1/04*   (2006.01)
(52) U.S. Cl.
    USPC ........................................................ 123/90.6
(58) Field of Classification Search
    USPC ............... 123/90.67, 188.2, 188.12, 188.13, 123/188.17, 90.12, 90.38; 251/337; 267/90, 267/94, 135, 166, 167, 170, 174, 178, 179, 267/204, 216, 217, 221, 286, 291; 188/381
    IPC .......................................... F01L 3/00,3/10, 3/22
    See application file for complete search history.

(56) References Cited

U.S. PATENT DOCUMENTS

| 15,869 | A | * | 10/1856 | French | 267/166 |
|---|---|---|---|---|---|
| RE1,421 | E | * | 2/1863 | Vose | 267/166 |
| 56,032 | A | * | 7/1866 | French | 267/166 |
| 101,724 | A | * | 4/1870 | French | 267/166 |
| 190,291 | A | * | 5/1877 | Davis | 267/166 |
| 191,361 | A | * | 5/1877 | Middleton | 267/166 |
| 198,843 | A | * | 1/1878 | Godley | 267/166 |
| 1,832,439 | A | * | 11/1931 | Wikander | 267/135 |
| 1,928,678 | A | * | 10/1933 | Sjolander | 267/135 |
| 2,015,820 | A | * | 10/1935 | Schowalter | 267/135 |
| 2,040,435 | A | * | 5/1936 | Griswold | 267/135 |
| 2,043,566 | A | * | 6/1936 | Wikander | 267/204 |
| 2,117,433 | A | * | 5/1938 | Krebs | 123/90.66 |
| 2,117,434 | A | * | 5/1938 | Krebs | 123/188.1 |
| 2,613,656 | A | * | 10/1952 | Leach | 123/90.29 |
| 2,821,971 | A | * | 2/1958 | Benz et al. | 123/90.66 |
| 3,480,286 | A | * | 11/1969 | Kosatka | 277/502 |
| 4,203,305 | A | * | 5/1980 | Williams | 464/60 |
| 4,317,436 | A | * | 3/1982 | Barnhart et al. | 123/188.6 |
| 4,509,473 | A | * | 4/1985 | Hamparian | 123/188.17 |
| 4,538,563 | A | * | 9/1985 | Mayers | 123/90.67 |
| 6,068,250 | A | * | 5/2000 | Hawkins et al. | 267/162 |
| 7,871,240 | B2 | * | 1/2011 | Zawilinski et al. | 415/117 |
| 2003/0222386 | A1 | * | 12/2003 | Duerre et al. | 267/166 |
| 2005/0183911 | A1 | * | 8/2005 | Wilda et al. | 188/322.15 |
| 2006/0163786 | A1 | * | 7/2006 | Youd et al. | 267/170 |
| 2008/0211155 | A1 | * | 9/2008 | Check et al. | 267/170 |
| 2008/0211156 | A1 | * | 9/2008 | Check et al. | 267/170 |
| 2011/0259689 | A1 | * | 10/2011 | Check et al. | 188/381 |

* cited by examiner

FOREIGN PATENT DOCUMENTS

JP     8-177422 A    7/1996

*Primary Examiner* — Kenneth Bomberg
*Assistant Examiner* — Jason T Newton
(74) *Attorney, Agent, or Firm* — Westerman, Hattori, Daniels & Adrian, LLP

(57) ABSTRACT

A valve train of an internal combustion engine equipped with a valve reciprocated by a cam is equipped with a spring seat manufactured in order to prevent the surging of a coil spring. A spring seat having a squeeze film effect of damping the axial motion of a coil spring is provided at one end of the coil spring in a closing direction. The spring seat is configured to be provided with an oil slit which radially intersects and extends helically around a valve axis.

16 Claims, 9 Drawing Sheets

List of various shapes of a spring seat with an oil slit

| SLIT FORMATION RANGE | TYPE OF HELIX OF SLIT | POSITIONS OF START/TERMINAL OF SLIT | |
|---|---|---|---|
| | | SOLID PORTION | EXPOSED TO END FACE |
| | | FIG. 8 | FIG. 9 |
| ONLY LARGE-DIAMETER PORTION | SINGLE HELIX | SHAPE A | SHAPE E |
| | DUAL HELIXES | SHAPE B | SHAPE F |
| BOTH CYLINDRICAL PORTION AND LARGE-DIAMETER PORTION | SINGLE HELIX | SHAPE C | SHAPE G |
| | DUAL HELIXES | SHAPE D | ----- |

FIG. 7

VALVE TRAIN OF INTERNAL COMBUSTION ENGINE

TECHNICAL FIELD

The present invention relates to a valve train of an internal combustion engine having a structure for preventing a coil spring from causing surging.

BACKGROUND OF THE INVENTION

A coil spring biasing each of the intake/exhaust valves of an internal combustion engine may cause surging, i.e., self-excited vibration during the high-speed rotation of the engine to result in the abnormal motion of the valve in some cases. The following technology is disclosed as a means for preventing surging (Japanese Patent Laid-open No. Hei 8-177422 (FIGS. 1 and 2)). The coil spring is partially formed with a tight-winding portion. Mutual-contact portions between the spring members of the tight-winding portion are designed to contact each other through corresponding flat surfaces generally perpendicular to the axial direction of the coil spring.

In this technology, at the normal rotation speed of the engine, the spring members of the tight-winding portion of the coil spring can be maintained in a mutual-contact state. However, a portion other than the tight-winding portion performs the normal expansion-contraction operation of the coil spring. The frequency of compulsory vibration applied to the coil spring via a cam reaches the vicinity of the resonance point of the coil spring. At this time, the tight-winding portion starts contact and separation due to the self-excited vibration and the confronting flat surfaces of the tight-winding portion collide with each other to lose the energy of the self-excited vibration. Further, the confronting flat surfaces of the tight-winding portion displace the oil remaining on the periphery of the tight-winding portion, so that the coil spring undergoes damping force. These suppress the surging of the coil spring.

One of Transactions of the Japan Society of Mechanical Engineers discloses a method of reducing the vibration transmission of a bearing portion by use of the damping effect of a squeeze film damper (Transactions of the Japan Society of Mechanical Engineers, (Series C), Nol. 53, No. 495 (1987-11), thesis No. 87-0049A, "Study on dumping effect of squeeze film damper").

SUMMARY OF THE INVENTION

An advantage of the present invention is to provide a valve train of an internal combustion engine equipped with a spring seat that can be manufactured simply at low cost and has a high damping function in order to prevent the surging of a coil spring.

One aspect of the instant invention relates to a valve train of an internal combustion engine including a valve reciprocated by a cam, and further including: a coil spring biasing the valve in a closing direction; and a spring seat provided at one end of the coil spring, the spring seat having a squeeze film effect of damping the axial motion of the coil spring.

In the above, the spring seat is designed to use the damping effect of the squeeze film damper; therefore, if the surging of the valve is reduced, the coil spring can be downsized. Thus, the engine can be downsized and the implanting depth of the valve stem guide can be ensured.

Another aspect of the invention is that in the valve train of an internal combustion engine, as described above, the spring seat has a structure provided with an oil slit radially intersecting and extending helically around a valve axis.

Accordingly, increasing the area of confronting surfaces of the oil slit is facilitated and it is not necessary to change the sectional shape of the coil spring. Since the helical portion is a singularly assembled part, the number of parts can be suppressed, the damping effect can be increased and the assembly performance can be enabled.

Another aspect of the invention is that in the valve train of an internal combustion engine, as described above, the helical oil slit of the spring seat has start and terminal points located axially offset inside, by a given distance, from a valve axial end face.

Thus, the end face is closed and shaped flat; therefore, an influence on the abutment portion of the cylinder head against the spring seat can be reduced.

Another aspect of the invention is that in the valve train of an internal combustion engine, as described above, the spring seat is such that a cylindrical portion guiding the internal circumference of the spring is formed integrally with a spring side end of a large-diameter portion.

It therefore is possible to prevent an influence on the surging reduction effect resulting from the fact that the coil spring moves radially and comes into contact with the valve stem guide.

Another aspect of the invention is that in the valve train of an internal combustion engine, as described above, the helical oil slit of the spring seat is formed to extend from one of the axial end faces to the other.

Accordingly, it is unnecessary to conduct a machining operation to terminate the oil slit at a position close to the end face, and an integral structure resulting from the connection with the cylindrical portion is provided. This can reduce an increase in the number of component parts and, therefore, reduce an increase in the assembly man-hours due to an increase in the number of component parts.

Another aspect of the invention is that in the valve train of an internal combustion engine, as described above, the cylindrical portion is provided to overlap the outer circumference of the valve stem seal provided on a valve stem guide.

Thus, the valve stem seal can be protected from the coil spring.

Another aspect of the invention is that in the valve train of an internal combustion engine, as described above, the internal combustion engine is provided with an intake port configured such that a centerline, close to an inlet opening, of the intake port formed in the cylinder head, intersects a cylinder axis at an acute angle so that an intake flow moves nearly downward, and the spring seat is provided at a portion of the intake valve in the intake port.

Since the valve train is downsized, the intake port can be brought close to the cylinder axis. This can achieve a balance between the improved performance of the engine and the prevention of surging.

Another aspect of the invention is that in the valve train of an internal combustion engine, as described above, the spring seat is provided such that the internal circumference of a central hole is close to a valve stem guide and an oil path adapted to lead oil into the oil slit is formed on the outer circumference of a spring seat.

The structure of leading oil to the oil slit only from the outer circumference is provided to limit the movement of the oil, which can more improve the surging prevention effect.

Another aspect of the invention is that in the valve train of an internal combustion engine, as described above, a weir for storing oil in the oil path is provided on the circumference of the spring seat.

Therefore, the weir can lead oil to the oil slit without complicating the oil reservoir structure.

Another aspect of the invention is that in the valve train of an internal combustion engine, as described above, an accessory such as a water temperature sensor can be installed below the intake port in the cylinder head.

Accordingly, since the valve train can be downsized, the intake port can be brought close to the cylinder axis. This produces the accessory installation space below the intake port. Thus, it is possible to achieve a balance between the improved performance of the engine and the protection of the accessories by the intake port.

BRIEF DESCRIPTION OF THE DRAWINGS

The advantages of the invention will become apparent in the following description taken in conjunction with the drawings, wherein:

FIG. 7 is a list of table shapes of a spring seat with an oil slit;

DETAILED DESCRIPTION OF THE INVENTION

Figure 1:
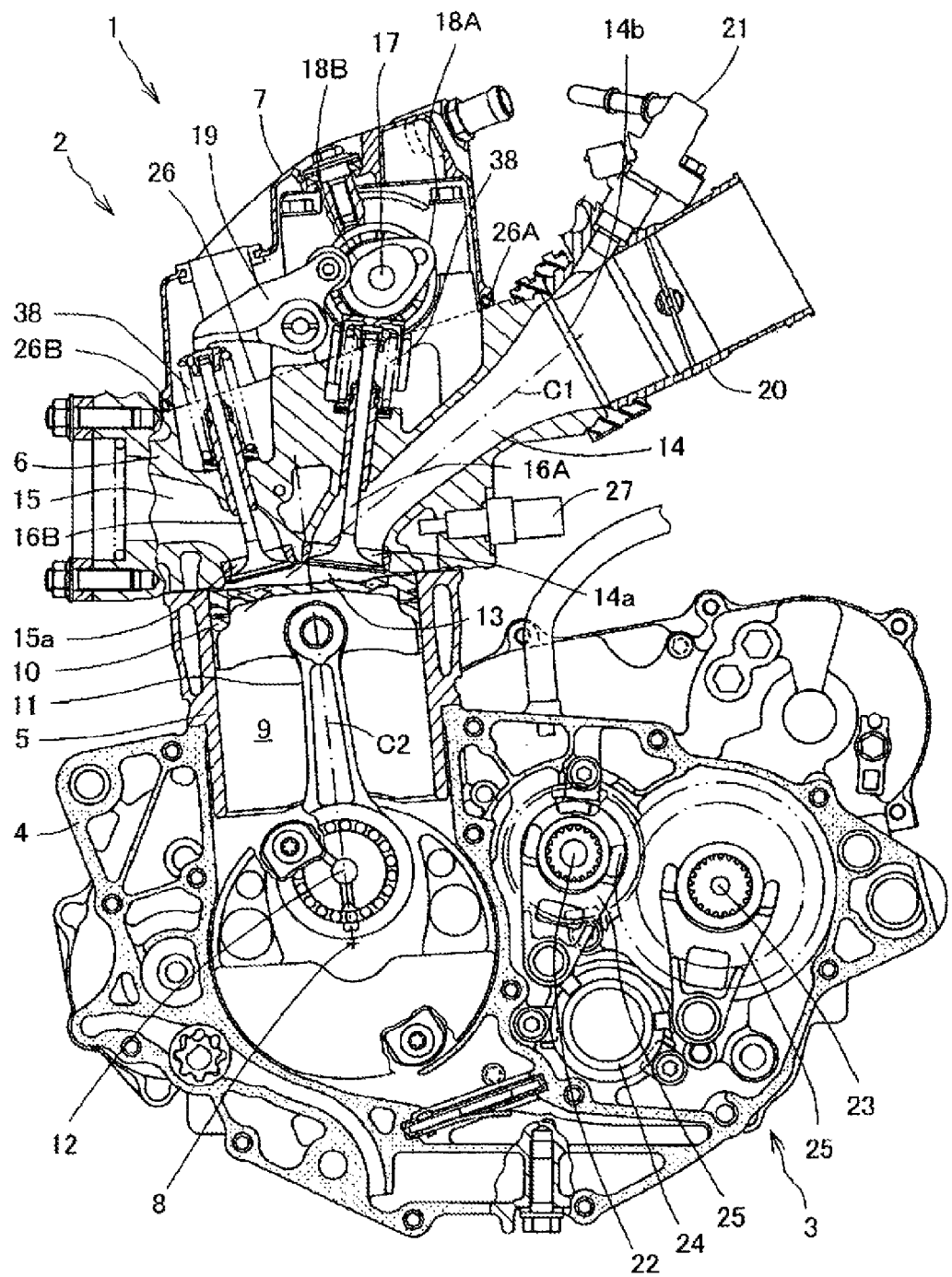
FIG. 1 is a lateral view of a motorcycle engine to which a valve train of the present invention is applied.

FIG. 1 is a lateral view of a motorcycle engine 1 to which a valve train of the present invention is applied. The engine is an integral engine 1 composed of an internal combustion engine 2 and a transmission 3. A shell of the engine 1 is composed of a crankcase 4, a cylinder block 5, a cylinder head 6 and a cylinder head cover 7. A crankshaft 8 is rotatably held in the crankcase 4. A cylinder bore 9 is formed in the cylinder block 5 so as to extend vertically cylindrically. In the cylinder bore 9 a piston 10 is provided vertically slidably. The piston 10 is connected to a crankpin 12 of the crankshaft 8 via a connecting rod 11. An intake port 14 and an exhaust port 15 formed in the cylinder head 6 communicate with a combustion chamber 13 formed by being surrounded by the cylinder bore 9, the cylinder head 6 and the piston 10. An intake valve 16A is provided at a combustion chamber side opening 14a of the intake port 14 and biased by a coil spring 38 in a direction of closing the combustion chamber side opening 14a. An exhaust valve 16B is provided at a combustion chamber side opening 15a of the exhaust port 15 and is biased by a spring 38 in a direction of closing the combustion chamber side opening 15a.

A camshaft 17 is rotatably supported by the cylinder head 6 so as to operatively open/close the intake valve 16A and the exhaust valve 16B. If the camshaft 17 is rotated, the intake valve 16A is directly driven by an intake cam 18A formed on the camshaft 17. The exhaust valve 16B is driven via a rocker arm 19 engaged with an exhaust cam 18B formed on the camshaft 17. Incidentally, in the following description, the intake valve 16A and the exhaust valve 16B, and the intake cam 18A and the exhaust cam 18B are simply abbreviated as the valve 16 and the cam 18, respectively, if it is not necessary to differentiate between intake and exhaust.

A throttle body 20 and an air cleaner (not illustrated) are connected to the intake port 14. A fuel injector 21 is mounted to the throttle body 20. The air purified by the air cleaner is sucked into the intake port 14 while being adjusted in flow by the throttle body 20.

The transmission 3 is installed rearward of the crankshaft 8 in the crankcase 4. The transmission 3 is a constant-mesh type transmission. A main shaft 22 and a counter shaft 23 are rotatably supported by the crankcase 4 and are provided with a plurality of paired constant-mesh type gears. The constant-mesh type gears are engaged and disengaged by a plurality of corresponding shift forks. The shift forks 25 are engaged with and driven by a shift drum 24 to engage fitting grooves provided on specific gears of the main shaft 22 or the counter shaft 23.

A left end of the counter shaft 23 in the rear portion of the crankcase 4 projects outwardly from the crankcase 4. A rear wheel drive sprocket (not illustrated) is attached to the left end. A rear wheel is drivingly rotated by the rear wheel drive chain wound between the rear wheel drive sprocket and a rear wheel driven sprocket attached to a rear axle.

Figure 2:
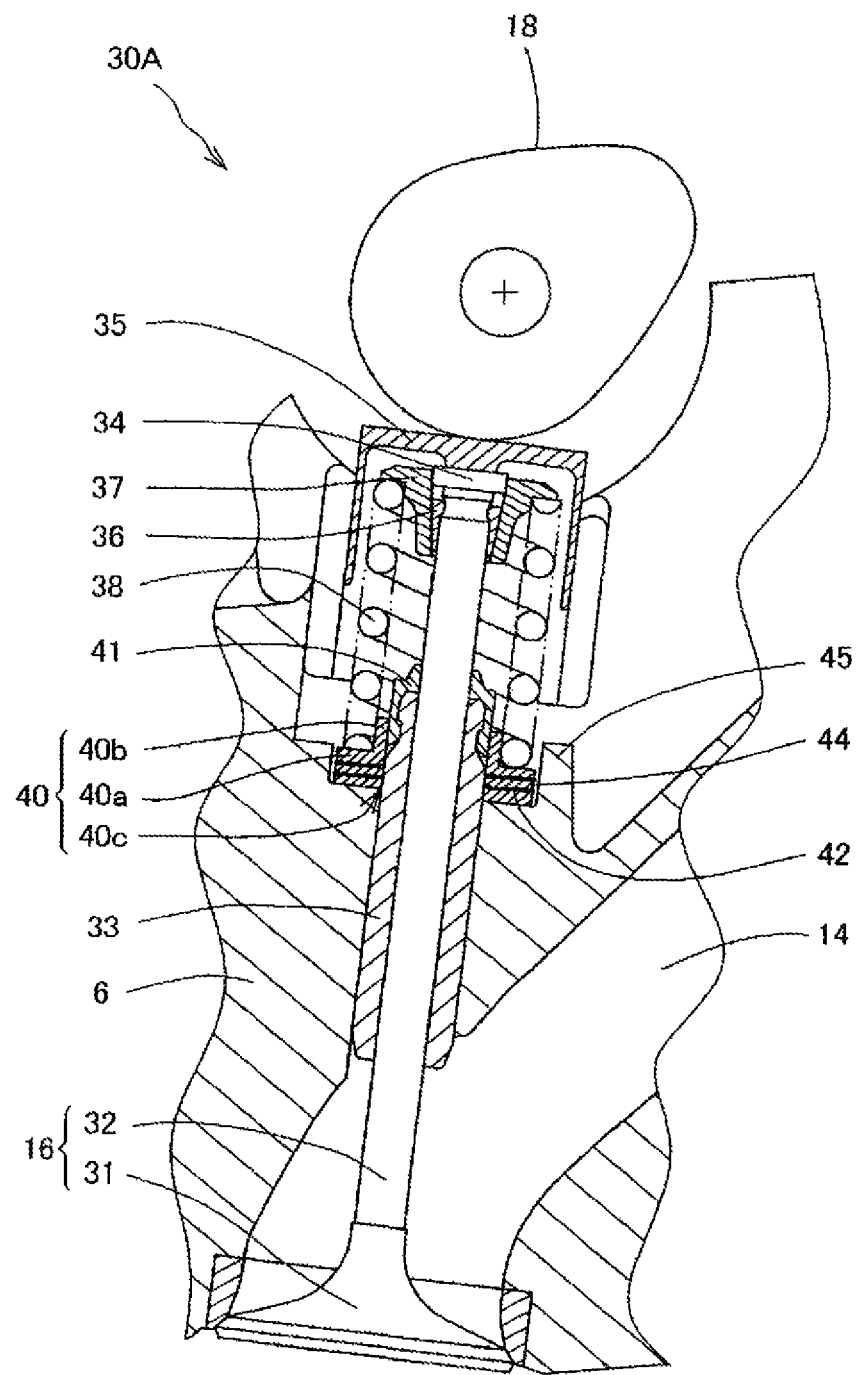
FIG. 2 is a cross-sectional view of an intake system valve train according to a first embodiment of the present invention.

FIG. 2 is a cross-sectional view of an intake system valve train 30A according to a first embodiment of the present invention. The configuration of this valve train can be applied also to an exhaust system drive train 30B. The valve 16 is composed of a valve head 31 and a valve stem 32 supporting the valve head 31. The valve stem 32 is slidably fitted to a valve stem guide 33 press fitted to the cylinder head 6. A lifter 35 is provided at a top end face of the valve stem 32 via a valve clearance adjusting shim 34. The valve stem 32 is provided at a top with a retainer 37 via a collet 36. The coil spring 38 is engaged at an upper end with the retainer 37. A spring seat 40 is provided between a lower end of the coil spring 38 and the cylinder head 6. The coil spring 38 is engaged at a lower end with the spring seat 40. A valve stem seal 41 is fitted to an upper end of the valve stem guide 33 to prevent the leakage of lubricating oil.

The coil spring 38 is attached between the retainer 37 and the spring seat 40 in a compressed state. The valve 16 is usually kept in a closed state by the biasing force of the coil spring 38. If the internal combustion engine 2 is operated, the projecting portion of the rotating cam 18 presses the lifter 35, whereby the valve 16 is shifted downward against the biasing force of the coil spring 38 for opening.

Figure 8:
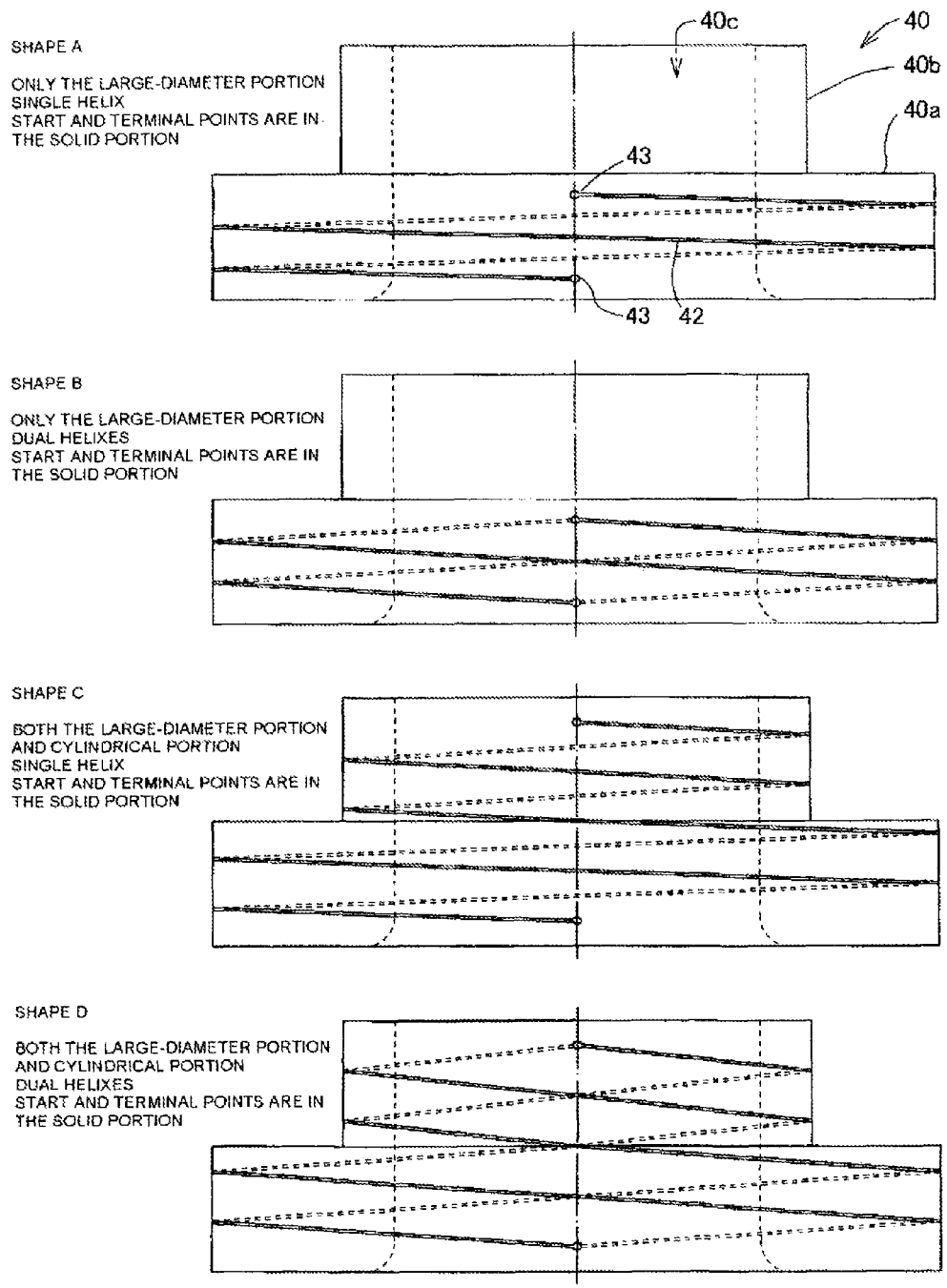
FIG. 8 includes lateral views of shapes A to D listed on the list of FIG. 7.
Figure 9:
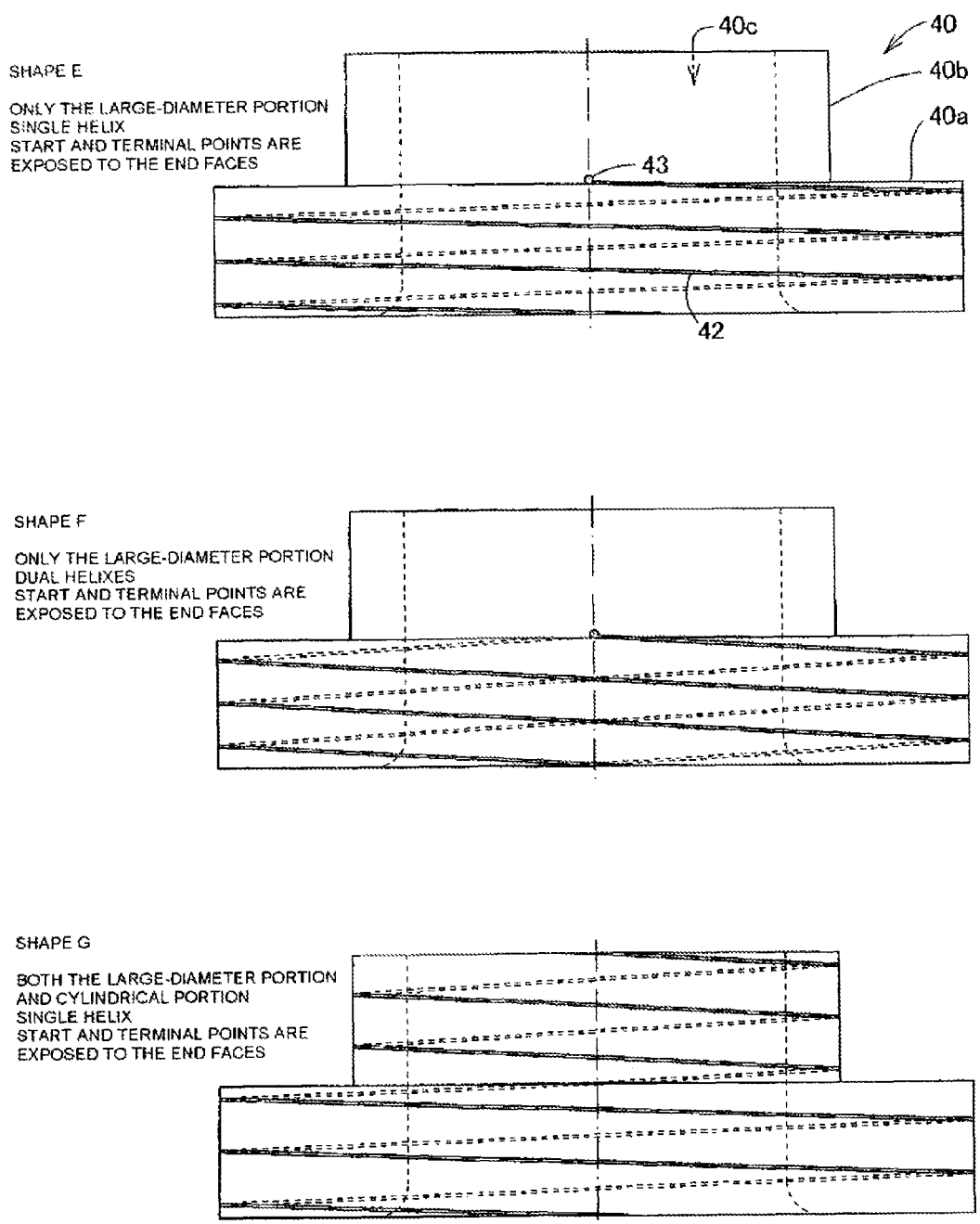
FIG. 9 includes lateral views of shapes E to G listed on the list of FIG. 7.

The spring seat 40 is made of steel and composed of a large-diameter portion 40a and a cylindrical portion 40b. An oil slit 42 which extends helically around a valve axis and has a minute gap is provided so as to radially intersect only the large-diameter portion 40a, or both the large-diameter portion 40a and cylindrical portion 40b, of the spring seat 40. The spring seat 40 can be shaped variously depending on the arrangement of the oil slit 42 and is used by selecting an appropriate shape. FIG. 7 is a list of various shapes of the spring seat 40. FIGS. 8 and 9 include lateral views of the spring seat 40 with the various shapes listed on the list of FIG. 7. The helical oil slit 42 is formed by wire electrical discharge machining.

The spring seat 40 illustrated in FIG. 2 has shape A of FIG. 8 and is such that the large-diameter portion 40a is provided with the oil slit 42. The spring seat 40 is provided with an oil path 44 on the outer circumference. The spring seat 40 provided with the oil slit 42 and immersed in lubricating oil has a squeeze film effect of damping the axial movement of the coil spring 38. An oil film exists between two surfaces facing each other and when the two faces approach each other, frictional resistance occurring when viscous fluid therebetween is squeezed produces high pressure in the oil film. When the viscous fluid is squeezed against such high pressure, much energy is consumed by friction. This is called the squeeze film effect. This frictional energy loss can damp the self-excited vibration of the coil spring, which can reduce the surging of the coil spring.

In FIG. 2, while the internal combustion engine 2 is rotating at low-speed, the oil slit 42 of the spring seat 40 adheres so that the coil spring 38 performs normal expansion-contraction operation. The internal combustion engine 2 rotates at high speed and the compulsory vibration applied to the coil spring 38 via the cam 18 reaches the vicinity of the resonance point of the coil spring 38. At this time, with a self-excited vibration of the coil spring 38, the spring seat 40 also vibrates, so that the oil slit 42 is influenced by the self-excited vibration to start contact-separation. When the oil between the facing surfaces of the slit 42 is squeezed, the energy of the self-exited vibration is lost. Further, the lubricating oil staying in the oil path 44 on the outer circumferential portion of the spring seat 40 is sucked and squeezed by the opening and closing, respectively, of the slit 42. In this way, the energy of the self-exited vibration is continuously lost and the coil spring 38 undergoes damping force. Thus, the surging of the coil spring 38 is suppressed.

The cylindrical portion 40b formed integrally with the spring side end of the large-diameter portion 40a of the spring seat 40 is adapted to guide the inner circumference of the coil spring 38. In FIG. 2, this prevents the radially moving coil spring 38 from coming into contact with the valve stem guide 33 and the valve stem seal 41, thereby otherwise exerting an undesirable influence on the surging reduction effect.

In FIG. 2, the cylindrical portion 40b is provided to overlap the outer circumference of the valve stem seal 41 provided on the valve stem guide 33. This has effects of protecting the valve stem seal 41 from the coil spring 38 and preventing the valve stem seal 41 from expanding and disengaging from an engaging portion.

A weir 45 functioning as an oil reservoir for storing lubricating oil is provided at the circumferential portion of the spring seat 40 in the cylinder head 6. This can sufficiently hold lubricating oil sucked into or discharged from the oil slit 42 via the oil path 44 formed on the circumference of the large-diameter portion 40a. The weir 45 is adapted to lead oil to the oil slit 42 via the oil path 44 without complicating the structure of the oil reservoir.

A central hole 40c having the same diameter passes through the cylindrical portion 40b and large-diameter portion 40a of the spring seat 40. The inner circumference of the central hole 40c is close to the valve stem guide 33 and the valve stem seal 41. In this way, lubricating oil is sucked into or discharged from only the outer circumferential side oil passage 44. The suction/discharge resistance of the lubricating oil is increased compared with the case where the lubricating oil is sucked and discharged from both the inner and outer circumferences. This increases energy consumption to effectively suppress surging.

Figure 3:
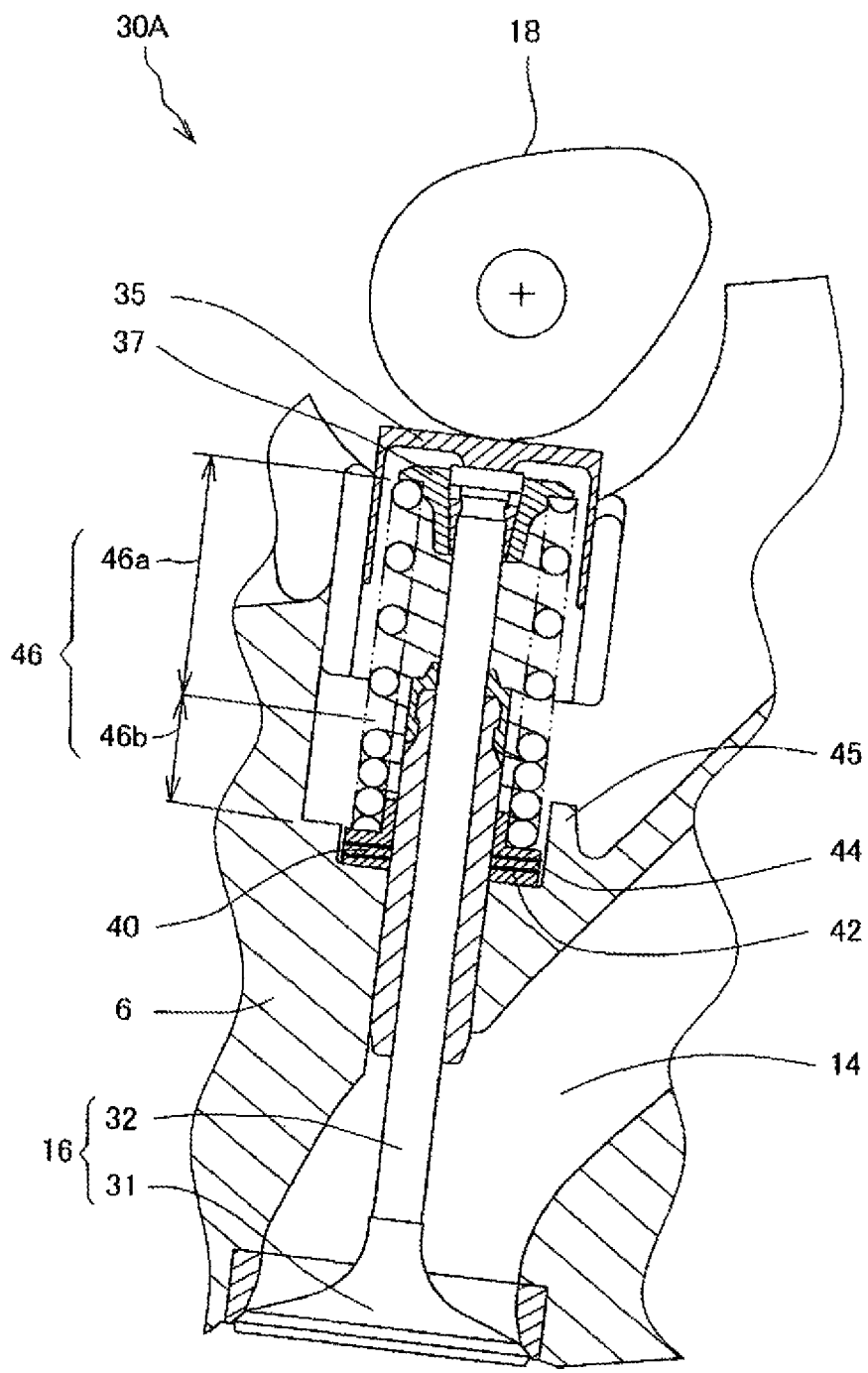
FIG. 3 is a cross-sectional view of an intake system valve train according to a second embodiment of the present invention.

FIG. 3 is a cross-sectional view of an intake system valve train 30A according to a second embodiment of the present invention. This valve train can be applied to the exhaust system valve train 30B. The valve train is different from that of the first embodiment (FIG. 2) in the following point. A coil spring 46 formed of a normal rough-winding portion 46a and a tight-winding portion 46b continuous therewith is used. In addition, in the tight-winding portion 46b, spring members adjacent to each other are brought into contact with each other. The shape and function of the other portions are the same as those of the first embodiment. The weir 45 for storing lubricating oil is similarly provided. The identical shape and function portions are denoted with like reference symbols.

In the present embodiment, the spring members adjacent to each other in the tight-winding portion 46b are brought into contact with each other. The compulsory vibration applied to the coil spring 46 via the cam 18 reaches the vicinity of the resonance point of the coil spring 46. At this time, with a self-excited vibration of the rough-winding portion 46a of the coil spring 46, the tight-winding portion 46b also vibrates, so that the tight-winding portion 46b in contact with each other starts contact-separation. During the contact-separation, the confronting portions of the tight-winding portion 46b collide with each other to lose the energy of self-excited vibration. At this time, also the spring seat 40 vibrates, so that the lubricating oil staying in the oil path 44 on the outer circumferential portion of the spring seat 40 inside the weir 45 is sucked and discharged by the opening/closing of the slit 42, thereby losing the energy of the self-excited vibration. Both the self-excited vibration damping effect of the tight-winding portion 46b and the self-excited vibration damping effect of the slit 42 of the spring seat 40 can further effectively suppress the surging of the coil spring 46.

Figure 4:
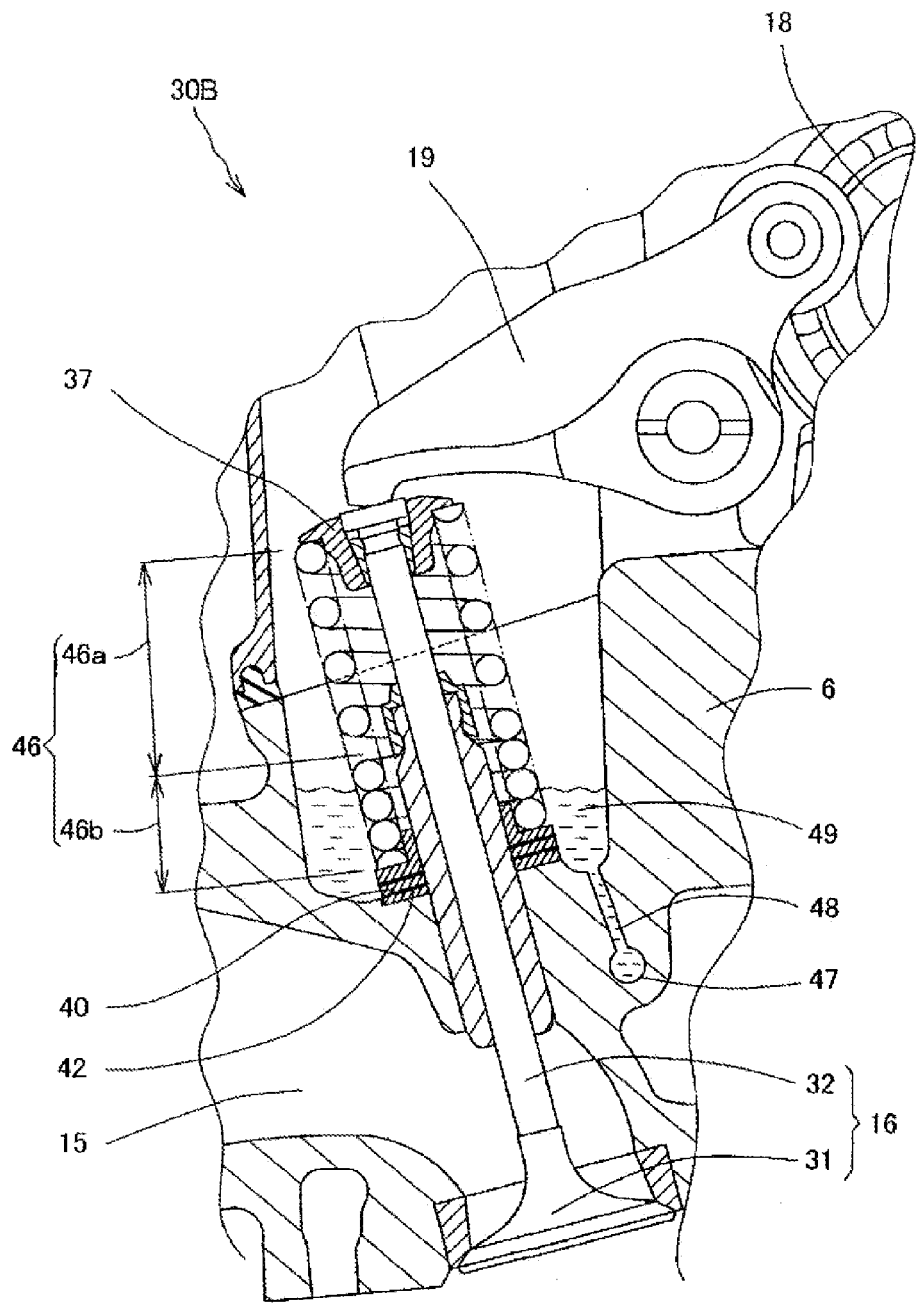
FIG. 4 is a cross-sectional view of an exhaust system valve train according to a third embodiment of the present invention.

FIG. 4 is a cross-sectional view of an exhaust system valve train 30B according to a third embodiment of the present invention. This valve train can be applied to the intake system valve train 30A. In the figure, a valve 16, a coil spring 46, a spring seat 40, etc. each have the same shape as that of the second embodiment (FIG. 3). The present embodiment is different from the embodiments described earlier in the following point. Lubricating oil 49 to be supplied to the spring seat 40 is stored not depending on the weir 45. There is provided a mechanism in which a bypass 48 is installed in the existing lubricating oil feed passage 47 to positively supply the lubricating oil 49 to the spring seat 40. With this configuration, the surging of the coil spring 46 can be allowed to function satisfactorily without the occurrence of run out of lubricating oil in the spring seat 40.

Figure 5:
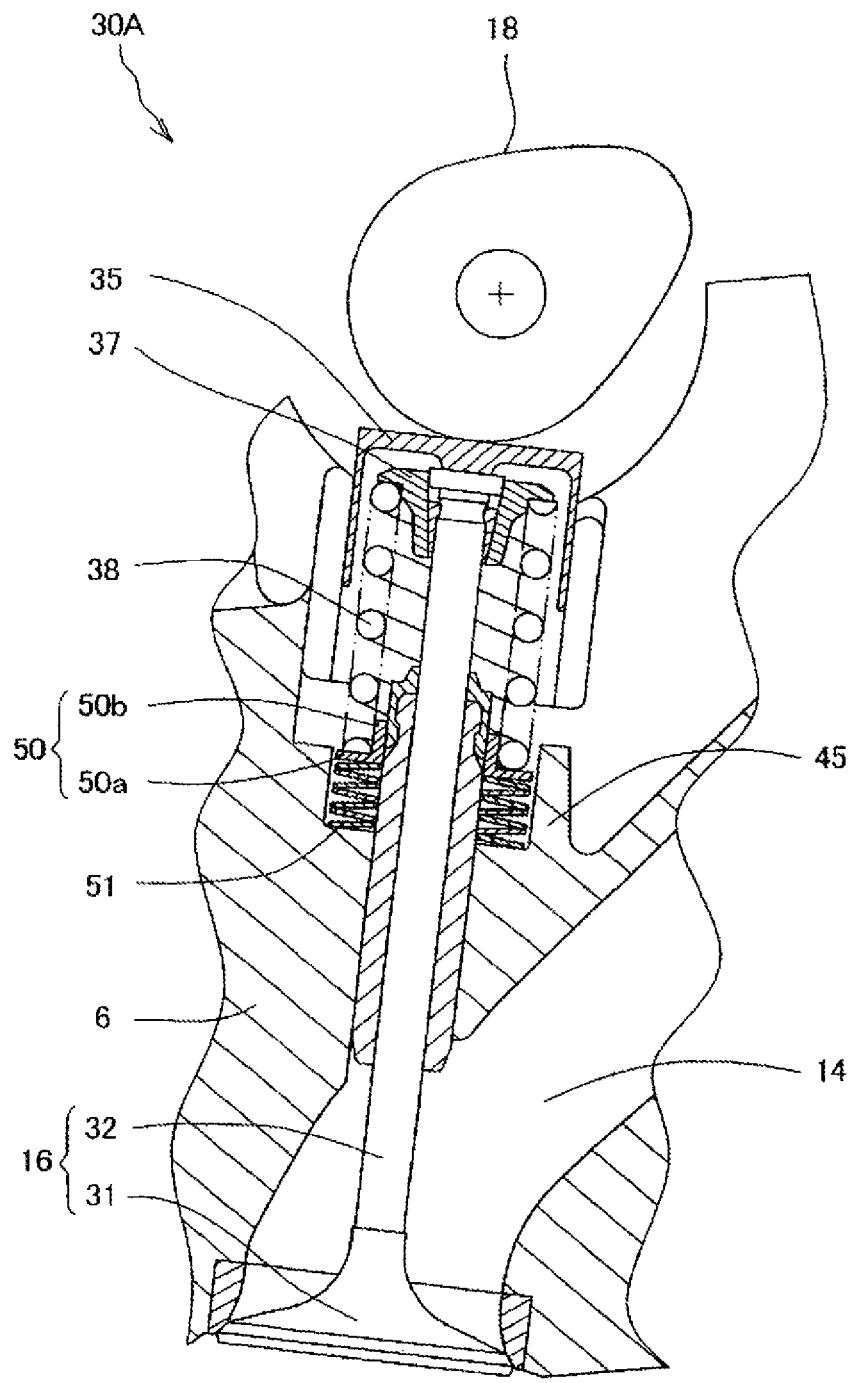
FIG. 5 is a cross-sectional view of an intake system valve train according to a fourth embodiment of the present invention.

FIG. 5 is a cross-sectional view of an intake system valve train 30A according to a fourth embodiment of the present invention. This valve train can be applied to the exhaust system valve train 30B. In the present embodiment, portions other than a spring seat are the same as those of the first embodiment (FIG. 2). The spring seat of the present embodiment includes a small-sized spring seat 50 composed of an annular flat plate portion 50a and a cylindrical portion 50b; and a plurality of disc springs 51 provided below the small-sized spring seat 50. The compulsory vibration applied to a coil spring 38 via a cam 18 reaches the vicinity of the resonance point of the coil spring. At this time, with a self-excited vibration of the coil spring 38, the plurality of disc springs 51 also vibrate to start contact-separation. The lubricating oil staying in the outer circumferential portion of the disc springs 51 repeat suction and discharge due to the compression and expansion of the disk springs 51. In this way, the energy of self-exited vibration is continuously lost and the coil spring 38 undergoes damping force. Thus, the surging of the coil spring 38 is suppressed.

Figure 6:
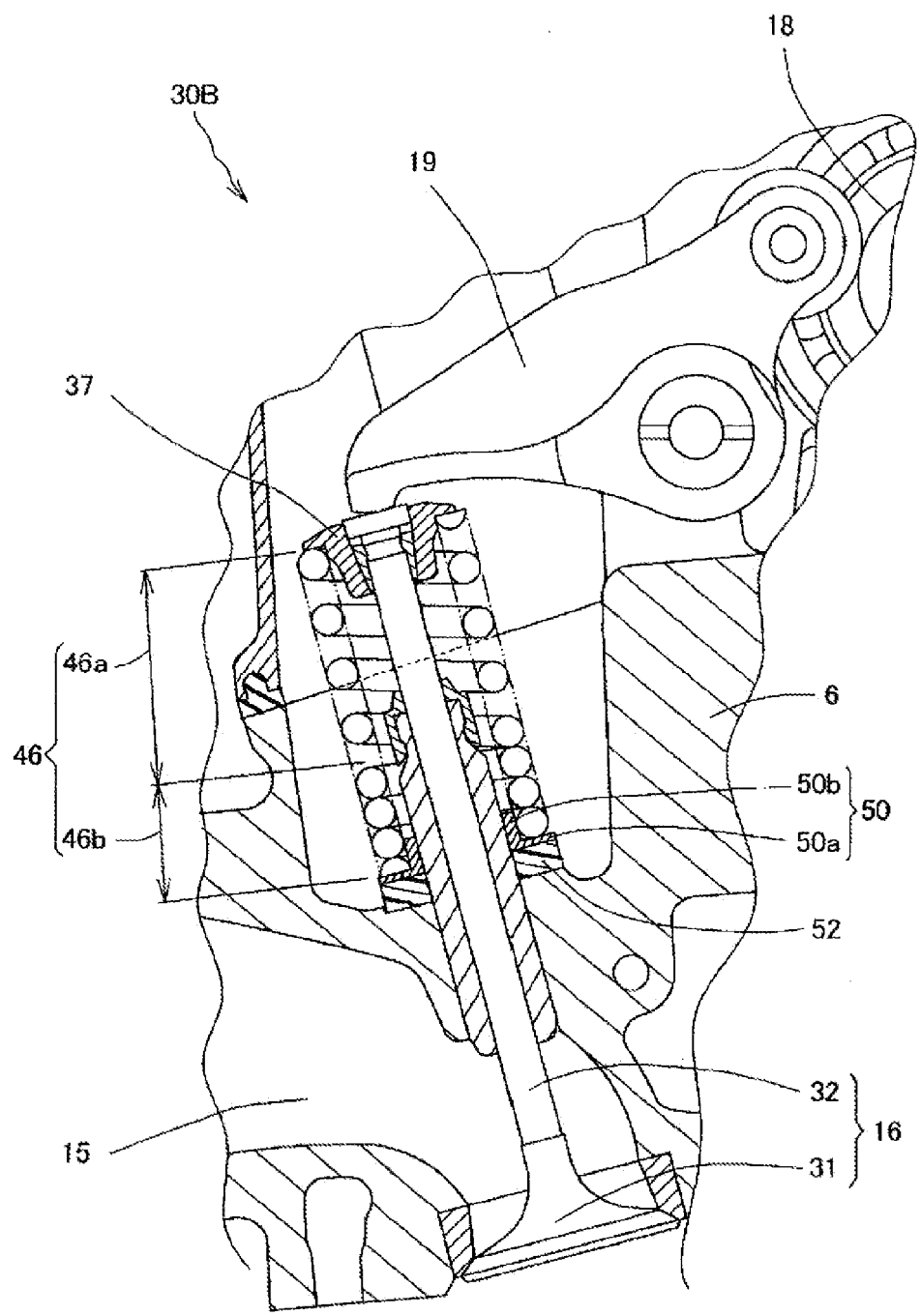
FIG. 6 is a cross-sectional view of an exhaust system valve train according to a fifth embodiment of the present invention.

FIG. 6 is a cross-sectional view of an exhaust system valve train 30B according to a fifth embodiment of the present invention. This valve train can be applied to the intake system valve train 30A. In the present embodiment, portions other than a spring seat are the same as those of the second embodiment (FIG. 3). In addition, a coil spring 46 composed of a rough-winding portion 46a and a tight-winding portion 46b is illustrated as the spring. A spring seat of the present embodiment includes the same small-sized spring seat 50 as that of FIG. 5, composed of the annular flat plate portion 50*a* and a cylindrical portion 50*b*; and a rubber damper 52 provided below the small-sized spring seat 50. The rubber damper 52 is made of synthetic rubber with high thermal resistance and burned into the small-sized spring seat 50. The rubber damper 52 has a natural vibration frequency in compression and expansion different from that of the coil spring 46. Therefore, the surging of the coil spring 46 is suppressed.

In FIG. 1, the intake system valve train 30A of the present invention is installed on the intake valve 16A. The valve train 30A of the present invention is downsized by the present invention. A rear portion 26A of a joint surface 26 between the cylinder head 6 and the cylinder head cover 7 can be set at a high level. The intake port external side opening portion 14*b* is installed near the joint surface rear portion 26A. A centerline C1 of the intake port 14 is formed generally linearly so that an intake flow moves nearly downwardly. The intake port centerline C1 can be made close to a cylinder axis C2 and allowed to intersect the cylinder axial line C2 at an acute angle. This can achieve a balance between the prevention of surging and the improved intake efficiency of the engine 1.

In FIG. 1, since the intake system valve train 30A can be downsized by the present invention, the rear portion 26A of the joint surface 26 between the cylinder head 6 and the cylinder head cover 7 can be set at a high level and the intake port external side opening portion 14*b* can be installed close to the joint surface rear portion 26A. An auxiliary installation space can be produced below the intake port 14. The internal combustion engine 2 is of a water-cooled type. A water temperature sensor 27 for detecting the temperature of cooling water can be installed in the auxiliary installation space. This can achieve a balance between the improved performance of the engine 1 and the protection of machinery by the intake port 14.

FIG. 7 is a table of various shapes of the spring seat 40 with an oil slit used in each of the first through third embodiments. A to G shown in the list are names of shapes. FIG. 8 includes lateral views of shapes A to D. FIG. 9 includes lateral views of shapes E to G listed on the table of FIG. 7.

The shapes of the spring seat 40 are defined by the combinations of the following items:

(1) The formation of the oil slit ranges over only the large-diameter portion or both the cylindrical portion and the large-diameter portion.

(2) The helical shape of the oil slit is a single helix or a dual helix.

(3) The positions of start and terminal points are within the solid portion or are exposed to the end face.

The size of the gap between the confronting surfaces of the oil slit is approximately 0.1 mm.

In shapes A to D of the spring seat 40 illustrated in FIG. 8, the start and terminal points of the oil slits 42 are located in the inside axially offset by a given distance from the axial end face. A fine drill bore 43 is provided at each of the start and terminal positions of the oil slit 42. This drill bore 43 is provided to receive a wire inserted therethrough at the time of start of the slit formation and to draw the wire at the time of termination of the slit formation. In the slit 42 of this type, the end face is closed and shaped flat. The end face of the slit has no filing operation on the abutment portion of the cylinder head 6 against the spring seat 40. This reduces scratching of the abutment surface on the side of the cylinder head 6. The start and terminal points of the oil slit are located in the circular cross-sectional portion of the drill bore; therefore, it is possible to prevent the occurrence of stress concentration.

In the spring seat 40 illustrated in FIG. 9, the oil slit 42 is formed to extend from one of the axial end faces to the other. This shape does not need machining to terminate the oil slit 42 at a position close to the end face. In particular, the shapes E and F are each formed as an integral structure resulting from the connection with the cylindrical portion. This can reduce an increase in the number of component parts and in assembly man-hours. Incidentally, also in the shapes E and F, it is preferred that a radial drill bore 43 with a small diameter be provided on the cylindrical portion 40*b* side of a boundary between the cylindrical portion 40*b* and the large-diameter portion 40*a* in order to receive wire inserted therethrough at a position of starting electrical discharge machining.

As described in detail, the embodiments described above produces the following effects:

(1) The spring seat 40 having the squeeze film effect of damping the axial movement of the coil spring 38 is provided at one end of the coil spring 38 biasing the valve 16 in the closing direction. Therefore, the surging of the valve can be reduced, the spring can be downsized, the engine 1 can be downsized and the implanting depth of the valve stem guide 33 can be ensured.

(2) The spring seat 40 is structured to be provided with the oil slit 42 which radially intersects and extends helically around the valve axis. Therefore, it is not necessary to vary the sectional shape of the spring per se. In addition, the helical portion is a singularly assembled part. Therefore, the increase in the number of component parts can be suppressed and also assembly performance can be improved.

(3) The helical oil slit 42 of each of the spring seats 40 (shapes A to D) is such that its start and terminal points are located in the inside axially offset by a given distance from the valve axial end face. Therefore, the end face is closed and formed flat. Thus, the end face will not scratch the abutment surface of the cylinder head 6 against the spring seat 40.

(4) In the spring seat 40, the large-diameter portion 40*a* is integrally formed at the end on the coil spring 38 side with the cylindrical portion 40*b* which guides the inner circumference of the coil spring 38. Therefore, it is possible to prevent an influence on the surging reduction effect resulting from the fact that the coil spring 38 moves radially and comes into contact with the valve stem guide 33 and the valve stem seal 41.

(5) The helical oil slit 42 of each of the spring seats 40 (shapes E to G) is formed to extend from one of the end faces to the other. Therefore, while making unnecessary the machining to terminate the oil slit 42 at a position close to the end face, an integral structure resulting from the connection with the cylindrical portion 40*b* is provided. This can reduce the increase in the number of component parts and also reduce the increase in the assembly man-hours due to the increased number of the component parts.

(6) The cylindrical portion 40*b* is provided to overlap the outer circumference of the valve stem seal 41 provided on the valve stem guide 33. Therefore, the valve stem seal 41 can be protected from the coil spring 38. In addition, it is possible to prevent the disengagement of the valve stem seal 41 due to the widening of the retaining portion of the valve stem seal 41.

(7) The internal combustion engine 2 using the valve train 30 of the present invention is provided with the intake port 14 configured such that the centerline C1 of the intake port 14 formed in the cylinder head 6 intersects the cylinder axis C2 at an acute angle so that the intake flow moves nearly downward. The spring seat 40 can be provided at a portion of the intake valve 16A in the intake port 14. This is because the valve train 30 is downsized to bring the intake port 14 close to the cylinder axis C2. This can achieve a balance between the improved performance of the engine and the prevention of surging.

(8) The spring seat 40 is provided such that the internal circumference of the central hole 40c is close to the valve stem guide 33. In addition, the oil path 44 adapted to lead oil into the oil slit 42 is formed on the outer circumference of the spring seat 40. The structure of leading oil to the oil slit 42 only from the outer circumference is provided to limit the movement of the oil, which more improves the surging prevention effect.

(9) The weir 45 which stores oil and leads it to the oil slit 42 via the oil passage 44 is provided on the circumference of the spring seat 40. The weir 45 can lead oil to the slit 42 without complicating the oil reservoir structure.

(10) The accessories such as the water temperature sensor 27 and the like are provided on the cylinder head 6 and below the intake port 14. Since the valve train 30 can be downsized, the intake port 14 can be brought close to the cylinder axis C2. This produces the accessory installation space below the intake port 14. Thus, it is possible to achieve a balance between the improved performance of the engine 1 and the protection of the accessories by the intake port 14.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A valve train of an internal combustion engine including a valve reciprocated by a cam, comprising:
   a coil spring biasing the valve in a closing direction; and
   a spring seat provided at one end of the coil spring, the spring seat having a squeeze film effect of damping the axial motion of the coil spring,
   wherein a squeeze film shape of the spring seat has a structure provided with an oil slit radially intersecting and extending helically around a valve axis.

2. The valve train for an internal combustion engine according to claim 1,
   wherein the helical oil slit of the spring seat has start and terminal points located axially offset inside, by a given distance, from a valve-axial end face.

3. A valve train of an internal combustion engine including a valve reciprocated by a cam, comprising:
   a coil spring biasing the valve in a closing direction; and
   a spring seat provided at one end of the coil spring, the spring seat having a squeeze film effect of damping the axial motion of the coil spring,
   wherein the spring seat is such that a cylindrical portion guiding the internal circumference of the spring is formed integrally with a spring side end of a large-diameter portion.

4. The valve train of an internal combustion engine according to claim 1,
   wherein the helical oil slit of the spring seat is formed to extend from one of the axial end faces to the other.

5. The valve train of an internal combustion engine according to claim 3,
   wherein the cylindrical portion is provided to overlap the outer circumference of a valve stem seal provided on a valve stem guide.

6. The valve train of an internal combustion engine according to any one of claims 1-3 and 5,
   wherein the internal combustion engine is provided with an intake port configured such that a centerline, close to an inlet opening, of the intake port formed in the cylinder head, intersects a cylinder axis at an acute angle so that an intake flow moves nearly downward, and the spring seat is provided at a portion of the intake valve in the intake port.

7. A valve train of an internal combustion engine including a valve reciprocated by a cam, comprising:
   a coil spring biasing the valve in a closing direction; and
   a spring seat provided at one end of the coil spring, the spring seat having a squeeze film effect of damping the axial motion of the coil spring,
   wherein the spring seat is provided such that the internal circumference of a central hole is close to a valve stem guide, and
   wherein an oil path adapted to lead oil into an oil slit is formed on the outer circumference of the spring seat.

8. The valve train of an internal combustion engine according to claim 7,
   wherein a weir for storing oil in the oil path is provided on the circumference of the spring seat.

9. The valve train of an internal combustion engine according to claim 6,
   wherein an accessory is installed below the intake port of the cylinder head.

10. The valve train of an internal combustion engine of claim 9, wherein said accessory is a water temperature sensor.

11. The valve train of an internal combustion engine of claim 10, wherein said spring seat includes squeeze film effect slits.

12. The valve train of an internal combustion engine according to claim 3,
    wherein the spring seat includes a helical oil slit which is formed to extend from one of the axial end faces to the other.

13. The valve train of an internal combustion engine according to claim 3,
    wherein the spring seat includes an oil slit, and
    wherein the spring seat is provided such that the internal circumference of a central hole is close to a valve stem guide, and
    wherein an oil path adapted to lead oil into the oil slit is formed on the outer circumference of the spring seat.

14. The valve train of an internal combustion engine according to any one of claims 1 or 2,
    wherein the spring seat is provided such that the internal circumference of a central hole is close to a valve stem guide, and
    wherein an oil path adapted to lead oil into the oil slit is formed on the outer circumference of the spring seat.

15. The valve train of an internal combustion engine according to claim 13,
    wherein a weir for storing oil in the oil path is provided on the circumference of the spring seat.

16. The valve train of an internal combustion engine according to claim 14,
    wherein a weir for storing oil in the oil path is provided on the circumference of the spring seat.

* * * * *